US008093778B2

(12) United States Patent
Schmid et al.

(10) Patent No.: US 8,093,778 B2
(45) Date of Patent: Jan. 10, 2012

(54) ELECTRIC MACHINE, PARTICULARLY ASYNCHRONOUS THREE-PHASE HYDROGENERATOR

(75) Inventors: Matthias Schmid, Birmenstorf AG (CH); Thomas Klamt, Schinznach-Dorf (CH); Ivan Mikic, Birr (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 12/698,341

(22) Filed: Feb. 2, 2010

(65) Prior Publication Data

US 2010/0194229 A1    Aug. 5, 2010

Related U.S. Application Data

(63) Continuation of application No. PCT/EP2008/058494, filed on Jul. 2, 2008.

(30) Foreign Application Priority Data

Aug. 3, 2007 (DE) .......................... 10 2007 036 806
Nov. 8, 2007 (DE) .......................... 10 2007 000 661

(51) Int. Cl.
H02K 3/12      (2006.01)
H02K 15/00     (2006.01)
(52) U.S. Cl. .......................................... 310/201; 310/71
(58) Field of Classification Search .................. 310/42, 310/71, 201
See application file for complete search history.

(56) References Cited

U.S. PATENT DOCUMENTS

| | | | |
|---|---|---|---|
| 2,407,935 A * | 9/1946 | Perfetti et al. ................ 310/201 |
| 3,675,058 A | 7/1972 | Beddows et al. | |
| 5,635,785 A | 6/1997 | Schwanda | |
| 5,789,840 A | 8/1998 | Gould et al. | |
| 5,965,965 A * | 10/1999 | Umeda et al. ................... 310/52 |
| 6,181,043 B1 * | 1/2001 | Kusase et al. ................... 310/201 |
| 6,181,045 B1 * | 1/2001 | Umeda et al. ................... 310/201 |
| 6,459,177 B1 * | 10/2002 | Nakamura et al. ..... 310/216.136 |
| 6,903,478 B2 * | 6/2005 | Dobashi et al. ............... 310/184 |
| 6,930,425 B2 | 8/2005 | Kato | |
| 7,038,346 B2 * | 5/2006 | Koike ........................... 310/184 |
| 2005/0229381 A1 * | 10/2005 | Kato ............................... 29/596 |

FOREIGN PATENT DOCUMENTS

| | | |
|---|---|---|
| DE | 1207999 B | 12/1965 |
| DE | 19513457 A1 | 10/1996 |
| FR | 2808935 A1 | 11/2001 |

OTHER PUBLICATIONS

International Search Report dated Apr. 3, 2009 issued in connection with PCT/EP2008/058494.
German Search Report dated Nov. 8, 2007.

\* cited by examiner

*Primary Examiner* — Tran Nguyen
(74) *Attorney, Agent, or Firm* — Leydig, Voit & Mayer, Ltd.

(57) ABSTRACT

An electrical machine, in particular a three-phase asynchronous hydrogenerator, includes a rotor and a stator, wherein one of the rotor and the stator include a core with a plurality of winding slots. The machine has a winding having a plurality of axially extending winding bars, wherein each of the plurality of winding slots receives two winding bars disposed one on top of the other, and wherein the plurality of winding bars emerge from the plurality of winding slots at an end side of the machine, and wherein each of a majority of the plurality of winding bars is electrically connected to another winding bar in an end winding so as to form a pair of winding bars according to a predetermined scheme.

9 Claims, 4 Drawing Sheets

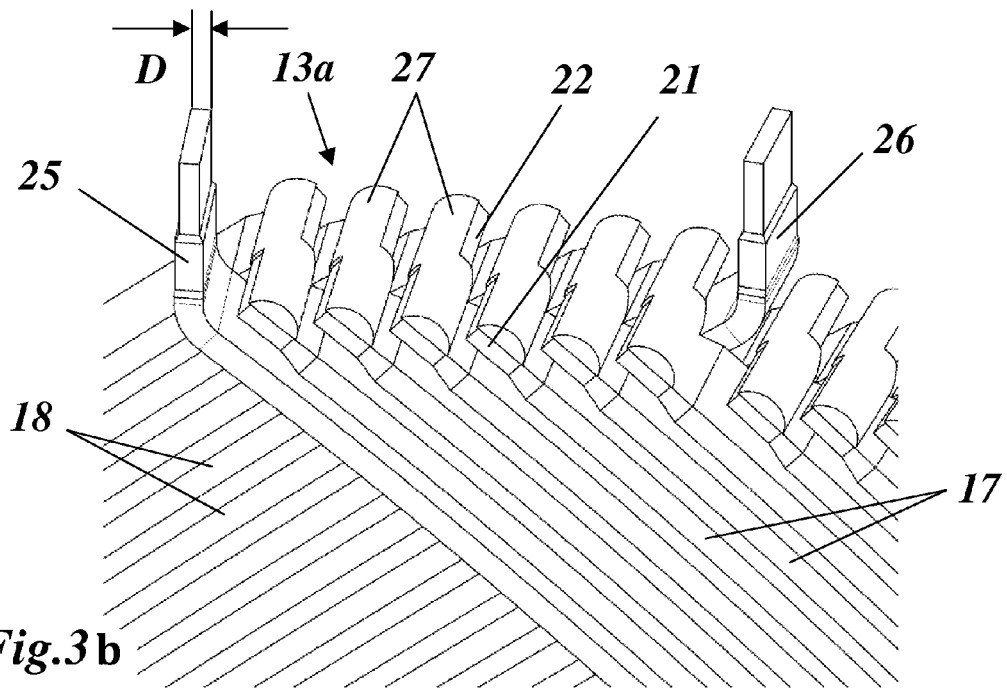
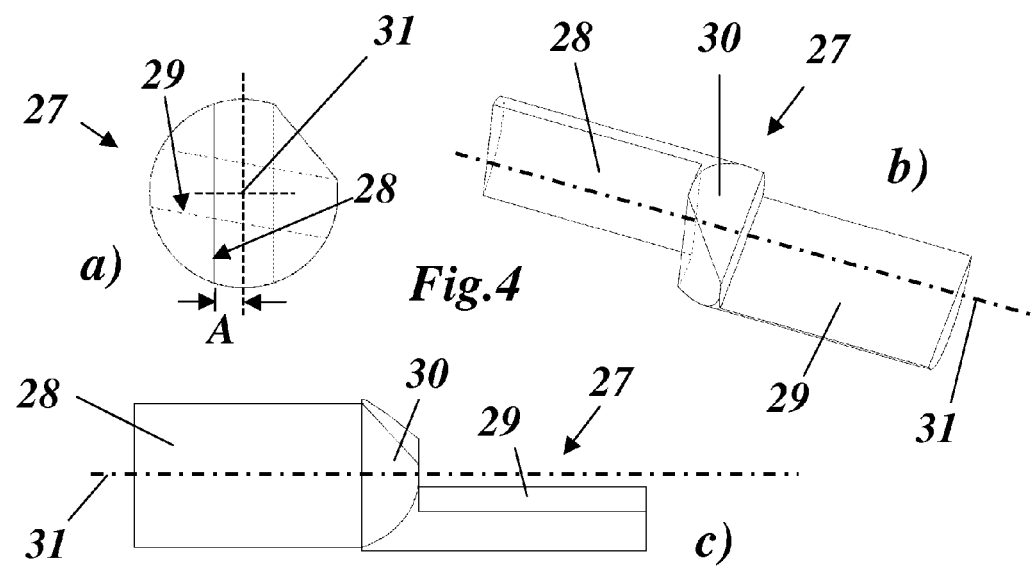

ELECTRIC MACHINE, PARTICULARLY ASYNCHRONOUS THREE-PHASE HYDROGENERATOR

This application is a continuation of International Patent Application No. PCT/EP2008/058494, filed on Jul. 2, 2008, which claims priority to German Patent No. DE 10 2007 000 661.8, filed on Nov. 8, 2007 and German Patent No. DE 10 2007 036 806.4, filed on Aug. 3, 2007. The entire disclosure of all references is incorporated by reference herein.

The present invention relates to the field of electrical machines. It relates to a winding of an electrical machine, in particular of a hydrogenerator.

BACKGROUND

As a result of changed market economy conditions on the open electricity markets and the improved technologies in the field of power electronics, the topic of variable-speed drives for energy production has gained in importance. For this purpose, double-fed asynchronous machines are preferably used, in particular at powers of above 60 MVA.

The stator of this type of machine is no different from the salient pole synchronous machines which are conventional for this application. Machines of this type are characterized by the fact that they are equipped with a three-phase winding both on the stator and on the rotor. Generally, the end windings of the rotor winding are in this case arranged on a cylindrical surface (DE-A1-195 13 457).

A corresponding (three-phase) winding scheme, for example for a rotor, is reproduced in FIG. 1, with the rotor circumference being illustrated in unrolled form in the plane of the drawing: the rotor 10 has a rotor core 11, in which axially extending winding slots 12 are provided. The winding slots 12 accommodate the winding 13, which is formed from winding bars 17, 18. Each phase is illustrated by a different type of line (short dashes, long dashes, continuous line). In each case two winding bars 17, 18 are accommodated one on top of the other in a winding slot. At the end sides of the rotor 10, the winding bars 17, 18 emerge from the winding slots 12, and the majority of said winding bars are electrically connected to one another in pairs at the ends in accordance with a predetermined scheme within an end winding 13a and 13b (connections 16). The remaining winding bars are passed to the outside as terminals 14, 15.

For the pairwise connection, in the prior art in each case one upper winding bar 18 of a first winding slot and one lower winding bar 17 of a second winding slot are bent towards one another at the end of the rotor core 11 in such a way that the two ends lie one on top of the other in the radial direction, as is reproduced in FIG. 2 in an enlarged detail for an end winding 13a'. The bar ends 19, 20 are aligned parallel to one another and one on top of the other by virtue of a second bend at the ends of the winding bars 17, 18, which are bent towards one another. The exposed (stripped of insulation) conductors of the winding bars 17, 18 form, in this region, lugs 21, 22 with a rectangular cross section, to which in each case one angular connecting part 23 or 24 is then fitted. The electrically conductive connection 16 (FIG. 1) is finally brought about by virtue of the two connecting parts 23, 24 being connected to one another.

The known formation of the end winding 13a' shown in FIG. 2 has various disadvantages: firstly, a second bend at the bar ends 19, 20 is necessary, and this involves additional complexity. Secondly, additional copper material for the parallel bar ends 19, 20 is required, as a result of which not only are the material costs increased, but also the axial length of the end winding and the winding resistance are increased.

It has therefore already been proposed in U.S. Pat. No. 5,789,840 to do away with the second bend in the end winding in the case of a stator winding and to connect the mutually crossing ends of the winding bars to be connected by means of a special multi-part connecting part. One disadvantage with this solution, however, is the multi-part design of the connecting part, which comprises two U-shaped connecting elements (62, 64) and a rotating pin (66) arranged in the center. As a result of the multi-part design, the connecting element can be matched to different crossing angles, but is complex in terms of manufacture and installation if a large number of connections need to be produced.

SUMMARY OF THE INVENTION

An aspect of the present invention is therefore to design an electrical machine of the type mentioned at the outset in such a way that the disadvantages of known machines are avoided and simplified installation and at the same time a more mechanically stable design are made possible, in particular whilst maintaining an axially shortened end winding.

In an embodiment, an integral connecting element is provided for the connection of the winding bars of an electrically connected winding bar pair. Since the crossing angle in the end winding in most cases is the same for all connections, only one type of connecting element with two embodiments, which are mirror-inverted with respect to one another, is required. These connecting elements can easily be prefabricated. Owing to the integral nature, the connecting element only needs to be connected to the two bar ends. In particular, there is no risk of the connecting element breaking into individual parts in the event of loading from centrifugal forces or vibrations. Furthermore, the integral nature also provides advantages in terms of current conduction because the transfer resistances are minimized.

One refinement of the invention is characterized by the fact that the ends of the electrically interconnected winding bars are in the form of straight lugs with a rectangular cross section, and that the connecting element is in the form of a round eyelet which is oriented in the radial direction and has two bearing faces, which lie one on top of the other so as to cross one another in the radial direction, for bearing against the lugs of the winding bars to be connected to one another. As a result, the connection has a particularly space-saving and aerodynamically favorable design. In particular, the crossing angles of the mutually crossing winding bar ends and of the mutually crossing bearing faces of the round eyelet are equal.

In accordance with another refinement of the invention, the round eyelet has a cylindrical basic shape, wherein the bearing faces are arranged parallel to the cylinder axis and are spaced apart from the cylinder axis by a distance which corresponds to half the thickness of the lugs.

Furthermore, it is advantageous for the electrical and mechanical properties if the round eyelet has a central piece between the two bearing faces.

Preferably, the length of the lugs is less than or equal to the outer diameter of the round eyelet. This prevents the lugs from protruding beyond the round eyelet in a disruptive manner.

The winding is preferably the rotor winding of the machine. However, it may also be the stator winding of the machine.

BRIEF DESCRIPTION OF THE DRAWINGS

The invention will be explained in more detail below with reference to exemplary embodiments in connection with the drawing, in which:

FIGS. 3a and 3b show illustrations which are comparable to FIG. 2 of the ends of winding bars and, respectively, the connection of the ends of the winding bars in accordance with a preferred exemplary embodiment of the invention by means of round eyelets; and FIG. 4 shows a plurality of subfigures 4(a) to 4(c) showing different views of a round eyelet from FIG. 3.

DETAILED DESCRIPTION

Figure 1:
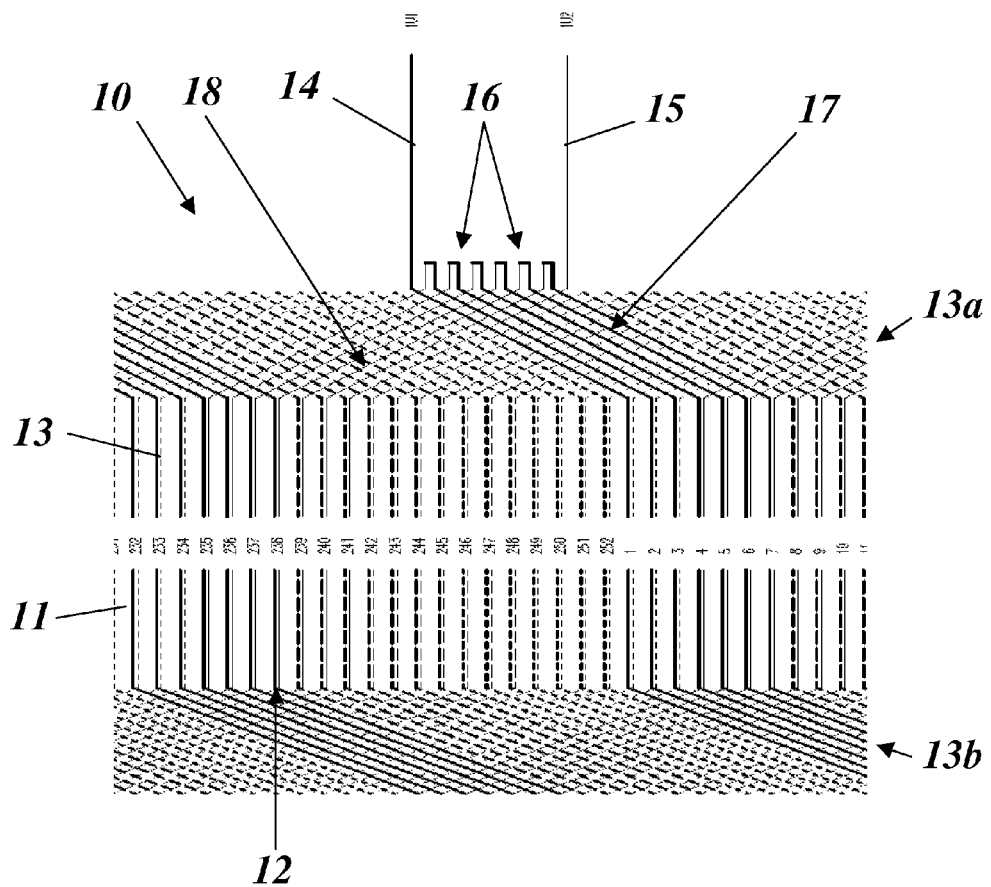
FIG. 1 shows an exemplary winding scheme of a three-phase rotor winding of a three-phase asynchronous hydro-generator.
Figure 2:
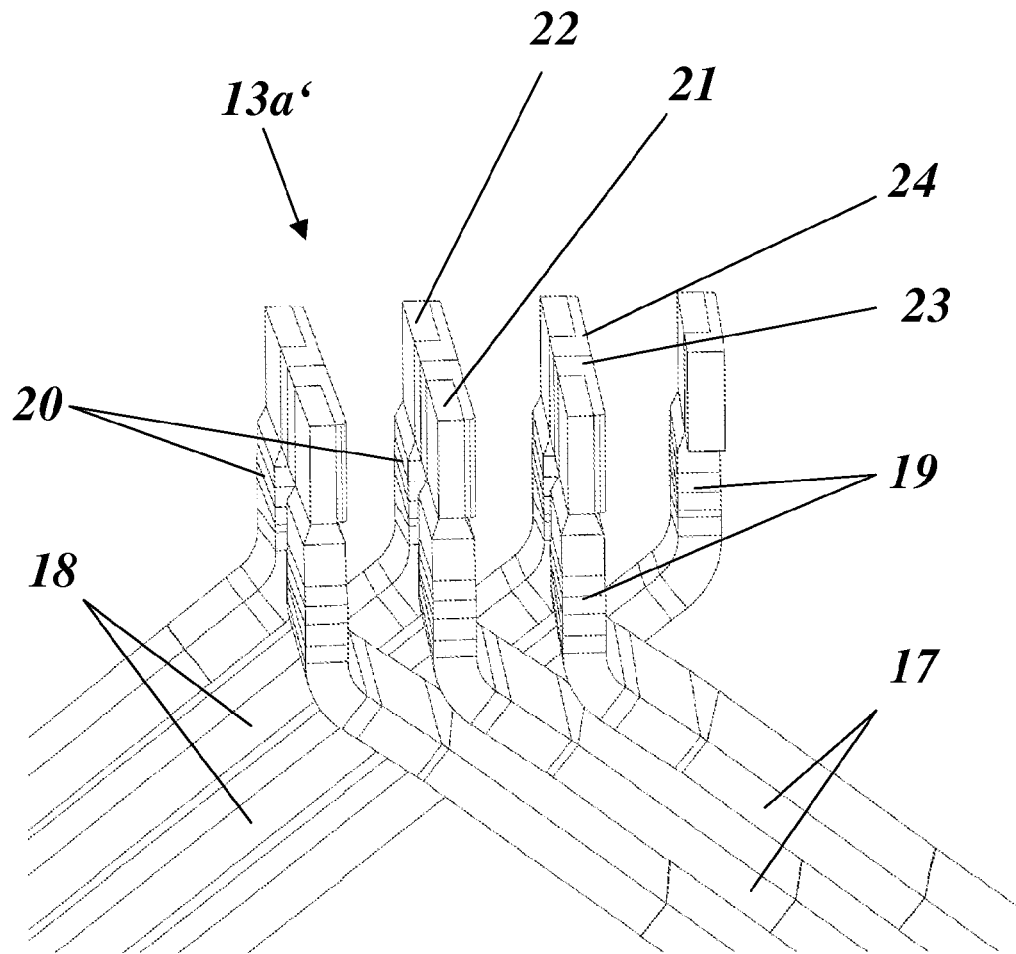
FIG. 2 shows the connection of the ends of the winding bars in the end winding of a winding as shown in FIG. 1, as is known from the prior art.
Figure 3A:
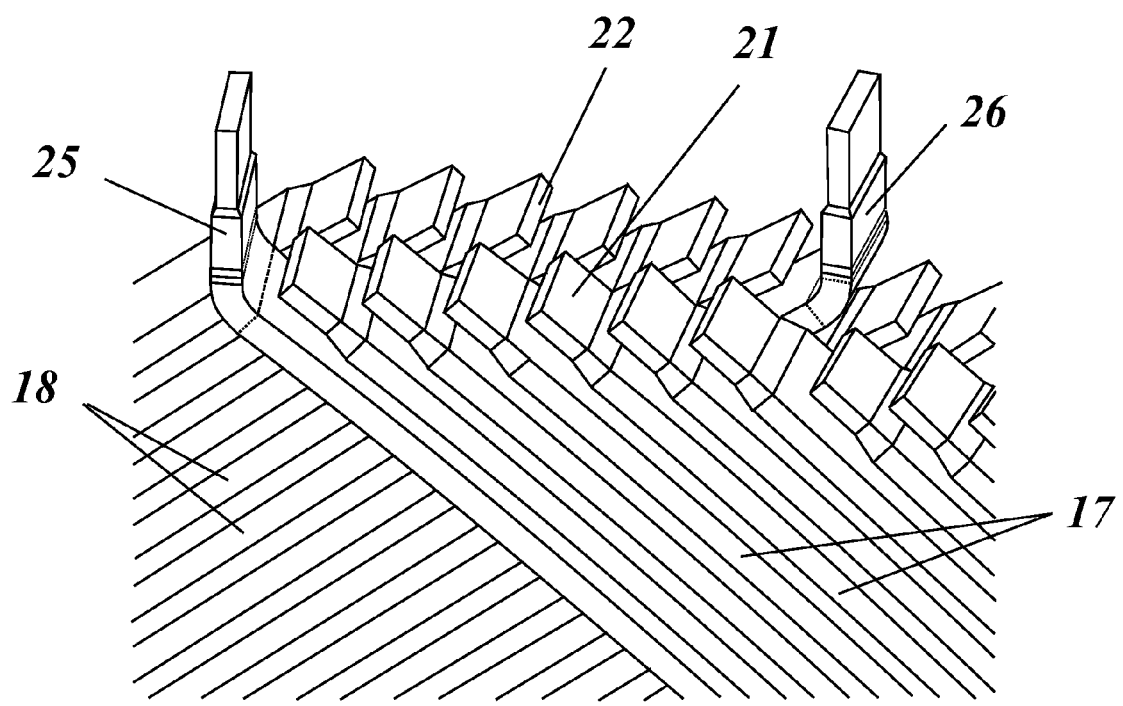

FIGS. 3a and 3b reproduce illustrations comparable to that in FIG. 2 of the ends of the upper winding bars 18 and the lower winding bars 17. FIG. 3a shows the winding bars 17, 18 without their respective ends connected, while FIG. 3b shows the connection of the ends of the winding bars in the end winding 13a of a winding in accordance with a preferred exemplary embodiment of the invention. The winding bars 17, 18, which emerge from the winding slots and are bent back once at the end of the winding slots, are fed towards one another without a second bend at the bar ends in such a way that they cross one another so as to lie one on top of the other in pairs with their (straight) ends. The mutually crossing ends are in this case the exposed (stripped of insulation) conductors, which protrude out of the bar ends in the form of lugs 21, 22, Coaxially to the crossing axis of the mutually crossing lugs 21, 22, a round eyelet 27, which is fixedly connected to the two lugs 21, 22, is arranged as an integral connecting element which is highly electrically conductive. Selected conductor bars, whose ends are unconnected, are bent a second time in the axial direction and are used, along with the terminal parts 25, 26 thus produced, for connecting the winding.

The round eyelet 27 used, which is illustrated in FIG. 4 per se, has a cylindrical basic shape with a cylinder axis 31. Two axially parallel, mutually crossing bearing faces 28 and 29 are formed one behind the other, separated by a central piece 30, along the cylinder axis 31. The crossing angle of the bearing faces 28, 29 corresponds to the crossing angle of the mutually crossing lugs 21, 22. The distance A between the bearing faces 28, 29 and the cylinder axis 31 corresponds to half the thickness D/2 of the lugs 21, 22 (FIG. 3). In this way, the lugs 21, 22 pass precisely centrally through the cylinder of the round eyelet 27 when said round eyelet 27 is fitted. As can clearly be seen from FIG. 3, the length of the lugs 21, 22 is less than or equal to the outer diameter of the round eyelet 27, with the result that the lugs 21, 22 do not protrude beyond the round eyelet 27 in a disruptive manner. The current transfer between the bar ends is optimized by the central piece 30 of the round eyelet. Copper, a copper alloy or another highly electrically conductive material can be used as material for the round eyelet.

Overall, the invention results in a shortened end winding, which saves on copper, reduces copper losses, can be supported more easily with respect to centrifugal forces (if the winding is a rotor winding), can be produced and fitted more easily and has a higher mechanical stability and safety. The winding according to the invention can be used both as a rotor and as a stator winding.

LIST OF REFERENCE NUMERALS 10 rotor
11 rotor core
12 winding slot
13 winding
13a, b end winding
14, 15 terminal
16 connection
17, 18 winding bar
19, 20 bar end (cranked)
21, 22 lug
23, 24 connecting part
25, 26 terminal part (cranked)
27 round eyelet
28, 29 bearing face
30 central piece
31 cylinder axis

What is claimed is:

1. An electrical machine comprising:
a rotor;
a stator, wherein one of the rotor and the stator include a core with a plurality of winding slots;
a winding having a plurality of axially extending winding bars, wherein each of the plurality of winding slots receives two winding bars disposed one on top of the other, and wherein the plurality of winding bars emerge from the plurality of winding slots at an end side of the machine, and wherein each of a majority of the plurality of winding bars is electrically connected to another winding bar in an end winding so as to form a pair of winding bars according to a predetermined scheme, the pair including an upper winding bar of a first winding slot and a lower winding bar of a second winding slot bent towards one another such that an end of the upper winding bar is disposed on top of an end of the lower winding bar so as to cross the end of the lower winding bar in a radial direction and such that the end of the upper winding bar is at an angle to the end of the lower winding bar; and
a plurality of integral connecting elements electrically connecting the respective ends of each upper winding bar and lower winding bar in each pair,
wherein the end of the upper winding bar and the end of the lower winding bar each include a straight lug, and wherein the connecting element extends in the radial direction and includes two bearing faces, wherein each one of the two bearing faces bears against each one of the straight lugs in the pair.

2. The electrical machine as recited in claim 1, wherein the electrical machine is a three-phase asynchronous hydrogenerator.

3. An electrical machine comprising:
a rotor;
a stator, wherein one of the rotor and the stator include a core with a plurality of winding slots;
a winding having a plurality of axially extending winding bars, wherein each of the plurality of winding slots receives two winding bars disposed one on top of the other, and wherein the plurality of winding bars emerge from the plurality of winding slots at an end side of the machine, and wherein each of a majority of the plurality of winding bars is electrically connected to another winding bar in an end winding so as to form a pair of winding bars according to a predetermined scheme, the pair including an upper winding bar of a first winding slot and a lower winding bar of a second winding slot bent towards one another such that an end of the upper winding bar is disposed on top of an end of the lower winding bar so as to cross the end of the lower winding bar in a radial direction; and a plurality of integral connecting elements electrically connecting each upper winding bar and lower winding bar in each pair, wherein the end of the upper winding bar and the end of the lower winding bar each include a straight lug having a rectangular cross section, and wherein the connecting element is formed as a round eyelet oriented in the radial direction and having two bearing faces disposed one on top of the other so as to cross one another in the radial direction, wherein each one of the two bearing faces bears against each one of the straight lugs in the pair.

4. The electrical machine as recited in claim 3, wherein the end of the upper winding bar and the end of the lower winding bar in each pair form a first crossing angle and the two bearing faces form a second crossing angle, and wherein the first and the second crossing angles are equal.

5. The electrical machine as recited in claim 3, wherein the connecting element has a cylindrical basic shape defining a cylinder axis, and wherein the two bearing faces are disposed parallel to the cylinder axis and spaced apart from the cylinder axis by a distance corresponding to half a thickness of one of the straight lugs.

6. The electrical machine as recited in claim 3, wherein the connecting element includes a central piece disposed between the two bearing faces.

7. The electrical machine as recited in claim 5, wherein a length of the two straight lugs is less than or equal to an outer diameter of the connecting element.

8. The electrical machine as recited in claim 1, wherein the core is a rotor core and the winding is a rotor winding of the machine.

9. The electrical machine as recited in claim 1, wherein the core is a stator core and the winding is a stator winding of the machine.

* * * * *